United States Patent
Kobayashi (10) Patent No.: US 9,141,892 B2
(45) Date of Patent: Sep. 22, 2015

(54) ADJUSTING ONE SIDE PRINT DATA TO AVOID OVERLAP WITH THE OTHER SIDE PRINT DATA IN TWO-SIDED PRINTING

(75) Inventor: Naoki Kobayashi, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 506 days.

(21) Appl. No.: 13/297,401

(22) Filed: Nov. 16, 2011

(65) Prior Publication Data

US 2012/0127501 A1     May 24, 2012

(30) Foreign Application Priority Data

Nov. 22, 2010 (JP) ................................. 2010-259839
Nov. 22, 2010 (JP) ................................. 2010-259840

(51) Int. Cl.
| | |
|---|---|
| G06F 15/00 | (2006.01) |
| G06K 1/00 | (2006.01) |
| G06K 15/00 | (2006.01) |
| G06K 15/02 | (2006.01) |
| G07G 5/00 | (2006.01) |

(52) U.S. Cl.
CPC .............. G06K 15/1868 (2013.01); G07G 5/00 (2013.01)

(58) Field of Classification Search
None
See application file for complete search history.

(56) References Cited

U.S. PATENT DOCUMENTS

| | | | |
|---|---|---|---|
| 7,532,833 B2 * | 5/2009 | Inoue ............................... 399/58 |
| 7,782,349 B2 | 8/2010 | Baba et al. | |
| 2002/0089686 A1* | 7/2002 | Kitahara et al. .............. 358/1.14 |
| 2004/0156664 A1* | 8/2004 | Vives et al. ..................... 400/82 |
| 2006/0039022 A1* | 2/2006 | Kondo ......................... 358/1.13 |
| 2006/0159480 A1* | 7/2006 | Mima et al. ..................... 399/82 |
| 2006/0171002 A1* | 8/2006 | Mori ............................ 358/538 |
| 2008/0170264 A1* | 7/2008 | Nino ........................... 358/1.17 |
| 2009/0058892 A1* | 3/2009 | VanDemark ...................... 347/2 |
| 2011/0102858 A1* | 5/2011 | Iguchi ........................... 358/448 |

FOREIGN PATENT DOCUMENTS

| | | |
|---|---|---|
| JP | 06-171158 | 6/1994 |
| JP | 10-129018 | 5/1998 |
| JP | 2003-058950 | 2/2003 |
| JP | 2007-320188 | 12/2007 |
| JP | 2009-123028 | 6/2009 |

* cited by examiner

Primary Examiner — Ming Hon (57) ABSTRACT

A print data processing method can generate print data for duplex printing so that the scanning accuracy of a barcode printed on one side of a receipt is not reduced by a logo or other graphic that is printed on the other side of the receipt. Whether or not a linear barcode or other code data B is contained in the front print data D1 that is printed on the front of the receipt is determined, and whether graphic data G is contained in the back print data D2 that is printed on the other side of the receipt is determined. If graphic data G is contained, the back print data D2 is adjusted so that the graphic data G is not printed to a position overlapping the code data B on the opposite side of the receipt.

19 Claims, 10 Drawing Sheets

ADJUSTING ONE SIDE PRINT DATA TO AVOID OVERLAP WITH THE OTHER SIDE PRINT DATA IN TWO-SIDED PRINTING

Priority is claimed under 35 U.S.C. §119 from Japanese patent application nos. JP 2010-259839 filed on Nov. 22, 2010 and JP 2010-259840 filed on Nov. 22, 2010, which are hereby incorporated by reference in their entirety.

BACKGROUND

1. Technical Field

The present invention relates to a print data processing method, a print data processing device, and a print data processing system for appropriately printing on both sides of a receipt or other recording medium in a POS system, for example.

2. Related Art

POS systems used in retail stores that issue receipts printed on both sides by a receipt printer connected to the POS terminal are known from the literature. The store name, transaction details, and a barcode containing an ID code for identifying a particular transaction, for example, may be printed on the front of the receipt while a coupon or advertising, for example, may be printed on the back.

Japanese Unexamined Patent Appl. Pub. JP-A-2009-123028 teaches a POS system that has a receipt printer for duplex printing. The receipt printer in this POS system has a first head that prints on one side of the receipt paper, and a second head that prints on the other side, and attempts to eliminate receipt paper waste by dividing and printing the transaction information in areas on both sides of the receipt paper outside the areas where fixed information such as advertisements and a store logo is printed to predetermined locations on the receipt paper so that the length of the receipt is as short as possible.

In addition to the printer taught in JP-A-2009-123028, other duplex printers print on both sides of the paper using a single printhead by reversing and refeeding cut-sheet media passed the printhead as taught in Japanese Unexamined Patent Appl. Pub. JP-A-H06-171158, or print on both sides by means of two printheads disposed to opposing positions with the recording medium conveyance path therebetween as taught in Japanese Unexamined Patent Appl. Pub. JP-A-H10-129018.

When receipts are thus printed on both sides, however, the content printed on the reverse side may be visible from the front, or the printing on the back may bleed through to the front. If printing on one side thus overlaps printing on the other side, the readability of information printed on the front may be undesirably reduced.

For example, when printing with an inkjet head, the ink deposited on one side may bleed through to the other side. When a thermal head is used for printing both sides of the paper, the heat-sensitive coating on the surface of one side may change color when the other side is printed, a problem also referred to herein as "bleed-through." When a graphic that is dark or has a high print density is printed on the back, the content printed on the back may be visible through the paper when reading the printing on the front. These problems of bleed-through and transparency occur particularly easily when using thin paper.

If printing on the reverse side bleeds through or is visible on the other side where content, such as a linear or two-dimensional barcode, that is intended to be read optically is printed, the scanning accuracy of the barcode or other content is easily reduced.

SUMMARY

A print data processing method, print data processing device, and print data processing system according to the present invention can generate print data for duplex printing so that barcodes and other scanning data that is printed on one side of the recording medium is not adversely affected by logos and other content printed on the other side of the recording medium, and problems such as reduced scanning accuracy and reduced readability do not occur.

A first aspect of the invention is a print data processing method that is a method of processing print data for printing on both sides of a recording medium, including: a first analyzing step that determines if first print data is contained in first-surface print data that is printed on a first surface on one side of the recording medium; a second analyzing step that determines if second print data is contained in second-surface print data that is printed on a second surface on the other side of the recording medium; and a data adjustment step that adjusts at least one of the first-surface print data and second-surface print data when the second print data is contained so that the first print data and the second print data are not printed at positions that overlap on the first surface and the second surface of the recording medium. The first print data and the second print data respectively being either scanning data that will be optically scanned, or graphic data other than scanning data.

The print data processing method according to the invention processes one or both first-surface print data and second-surface print data so that first print data that is printed on a first surface of the recording medium and second print data that is printed on the second surface on the opposite side are not printed at mutually overlapping positions. Therefore, if the recording medium is printed on both sides using the first print data and second print data after the data is adjusted, problems caused by image bleed-through and images printed on one side being visible on the other side will not occur because the printing positions of the first print data and second print data do not overlap.

If graphics such as logos that must be readable, and scanning data such as barcodes that are read with an optical scanner, are preset as the first and second print data, a drop in readability and scanning accuracy can be avoided. In addition, when printing on both sides of a thin recording medium that is particularly susceptible to such bleed-through and transparency problems, graphic data can be set as the first and second print data so that graphic data with a high print density is not printed at overlapping positions on both sides of the recording medium. Alternatively, if graphic data is set as the first print data and text data is set as the second print data, graphic data for an advertisement printed on one side bleeding through or being transparent to the other side can be prevented from making transaction information and other text data printed on the other side difficult to read.

More particularly, if a high print density graphic is printed on the reverse side opposite a linear barcode or 2D barcode that is to be optically scanned, the scanning accuracy of the linear barcode or 2D barcode will drop. To prevent this, a linear barcode or 2D barcode may be set as the first print data, and graphic data may be set as the second print data. Conversely, graphic data may be set as the first print data and a linear barcode or 2D barcode may be set as the second print data. Note that scanning data as used in the invention is data that is read optically after being printed (data that is intended to be optically scanned), and linear barcodes and 2D barcodes are typical examples thereof. The invention is not so limited, however, and the scanning data may be a symbolic mark consisting of text, graphic, symbol, pattern, or any other printed data that is intended to be optically scanned after printing.

To prevent first print data and second print data from being printed at overlapping positions on the front and back sides of the recording medium, the data adjustment step preferably adjusts the second-surface print data so that a printing position on the second surface opposite a first-surface printing position where the first print data is printed is white space or is a printing position for text data contained in the second-surface print data.

In addition, when graphic data is printed continuously on the second surface on the opposite side as the first surface to which the first print data is printed, the second-surface print data is preferably adjusted so that the space between the graphic data is white space or a printing position for text data contained in the second-surface print data, and the first-surface print data is adjusted so that the first print data is printed on the first surface at a position corresponding to the white space or the text data.

In another aspect of the invention, the print area for second-surface print data on the second surface of the recording medium is divided into a plurality of predefined zones; and the data adjustment step adjusts the second-surface print data so that the second print data is not printed in a zone on the second surface opposite a first-surface printing position where the first print data is printed.

Alternatively, part of a print area of the first-surface print data on the first surface of the recording medium is predefined as a first-surface printing position for the first print data; and the data adjustment step adjusts the second-surface print data so that the second print data is not printed to a printing position on the second surface opposite the first-surface printing position.

When the invention is applied to a POS system or other system that produces duplex printed receipts, the first-surface print data is print data for producing a receipt containing text data representing transaction content and linear barcode data or two-dimensional barcode data representing an ID for identifying the transaction, or is first-surface print data for producing a receipt containing linear barcode data or two-dimensional barcode data representing store data and text data representing transaction content. The second-surface print data is second-surface print data for producing a receipt containing the graphic data for a coupon or advertisement.

Alternatively, the first-surface print data is first-surface print data for producing a receipt containing the graphic data representing a store logo and text data representing transaction content. The second-surface print data is second-surface print data for producing a receipt containing the graphic data for a coupon or advertisement, and linear barcode data or two-dimensional barcode data.

Another aspect of the invention is a print data processing device that processes print data for printing on both sides of a recording medium, including: a first analyzing unit that determines if first print data is contained in first-surface print data that is printed on a first surface on one side of the recording medium; a second analyzing unit that determines if second print data is contained in second-surface print data that is printed on a second surface on the other side of the recording medium; and a data adjustment unit that adjusts at least one of the first-surface print data and second-surface print data when the second print data is contained so that the first print data and the second print data are not printed at positions that overlap on the first surface and the second surface of the recording medium.

Another aspect of the invention is a print data processing system including a duplex printing device that prints on both sides of a recording medium, and a host device that is connected to the duplex printing device and sends print data for printing on both sides of a recording medium, wherein either the duplex printing device or the host device includes: a first analyzing unit that determines if first print data is contained in first-surface print data that is printed on a first surface on one side of the recording medium; a second analyzing unit that determines if second print data is contained in second-surface print data that is printed on a second surface on the other side of the recording medium; and a data adjustment unit that adjusts at least one of the first-surface print data and second-surface print data when the second print data is contained so that the first print data and the second print data are not printed at positions that overlap on the first surface and the second surface of the recording medium.

Effect of the Invention

The invention adjusts first-surface print data and second-surface print data for printing both sides of a recording medium so that barcode data or other first print data that is printed on a first surface is not printed at a position overlapping second print data such as graphic data that is printed on a second surface on the opposite side. A graphic with a high print density printed on one side bleeding through to or being visible from the other side can therefore be reliably prevented from causing a drop in the readability or a drop in the scanning accuracy of a barcode or other content printed on the other side.

DESCRIPTION OF EMBODIMENTS

A preferred embodiment of the present invention applied to the POS terminal of a POS system that is used in a supermarket, convenience store, or other retail business is described below with reference to the accompanying figures.

POS System

Figure 1:
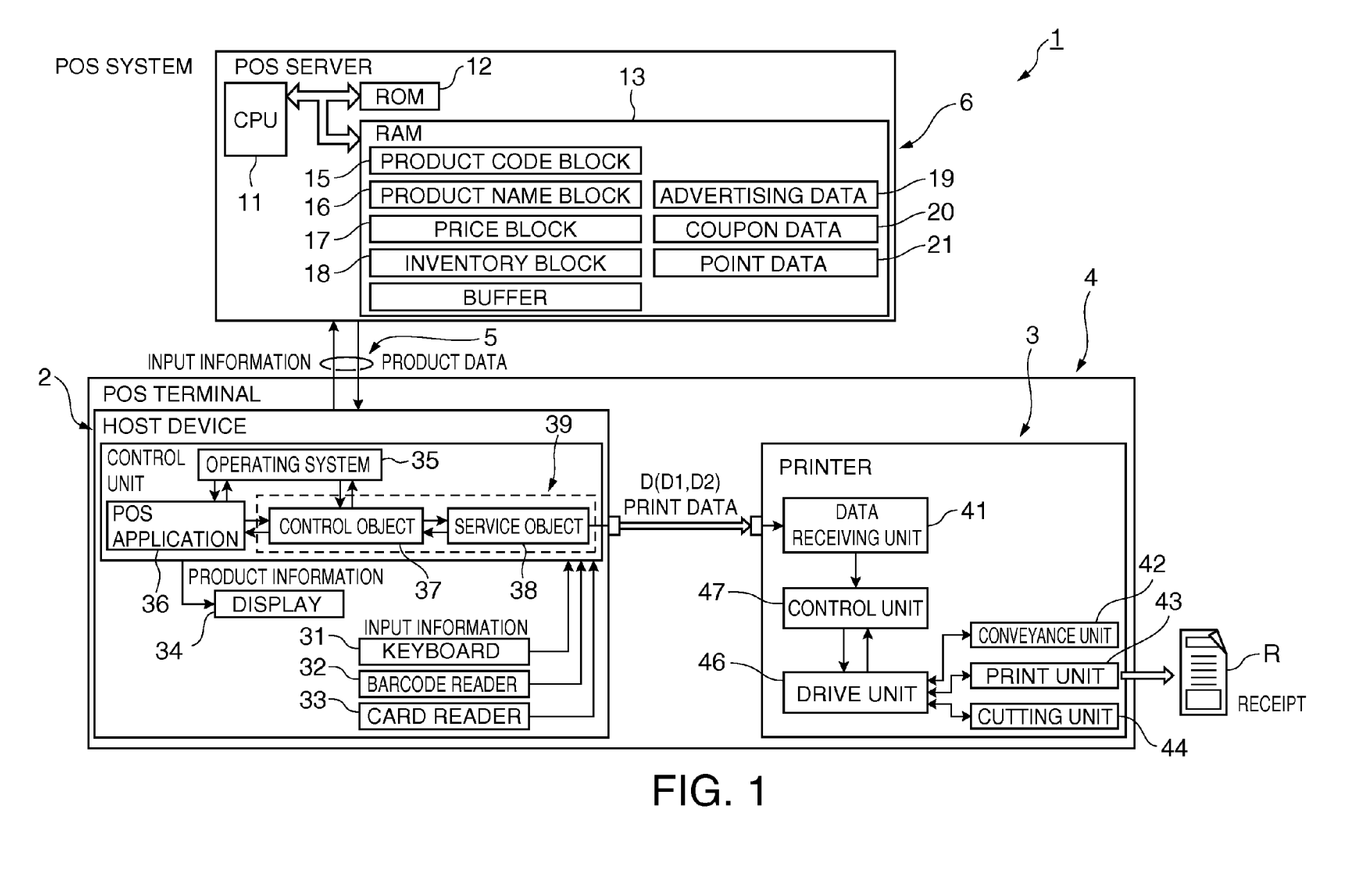
FIG. 1 is a block diagram of a POS system according to the invention.

As shown in FIG. 1, a POS system 1 according to this embodiment of the invention includes a POS terminal 4 that has a host device (POS terminal computer) 2 and a duplex printer (receipt printer) 3, and a POS server 6 that centrally manages the POS terminal 4 through a wired or wireless network 5.

The POS server 6 includes a CPU 11 and memory such as ROM 12 and RAM 13, and processes information stored in buffers in RAM 13, for example, according to a control program stored in ROM 12. Storage areas such as a product code block 15, product name block 16, price block 17, inventory block 18, advertising data 19, coupon data 20, and point data 21 are included in RAM 13. Based on input information sent from the POS terminal 4 side, the CPU 11 extracts information related to product codes, product names, and price, and generates product data used for printing transaction information on a receipt (recording medium) R and display on the POS terminal 4 display.

Note that product data as used herein refers to data on which transaction information print data for printing transaction process content on a receipt R is based. The product code block 15, product name block 16, and price block 17 are rendered by a lookup table commonly called the product master.

The host device 2 of the POS terminal 4 references the product master on the POS server 6 to get product data and generate transaction information print data. The duplex printer 3 of the POS terminal 4 produces a receipt R by printing based on the transaction information print data. The host device 2 and duplex printer 3 are connected by a wired or wireless communication connection. When a duplex printed receipt R is issued, the host device 2 generates and sends front print data (first-surface print data) D1 and back print data (second-surface print data) D2 to the duplex printer 3 for printing to the front (first surface) and back (second surface) of the receipt R as the transaction information print data D. Based on this data D1, D2, the duplex printer 3 produces a receipt R printed on both sides.

The host device 2 gets information related to the products (product information) by the operator inputting information through the keyboard 31 or scanning product barcodes with a barcode reader 32. The host device 2 also gets information for credit card transactions and customer-related information by scanning a customer credit card or member card with a card reader 33, supplies this input information to the POS server 6, and acquires product data for display and printing from the POS server 6. The host device 2 has a display 34 that displays product information generated from the product data acquired from the POS server 6, and displays the information so that the operator and customer can check the purchased products, prices, and other information.

The host device 2 is controlled by an OLE for Retail POS (OPOS) printer driver that runs on the Windows® operating system 35. OPOS provides a device-independent interface for peripheral devices such as the duplex printer 3 and barcode reader 32 to the POS application 36 running under the operating system 35, and is composed of a control object 37 for each device category and a service object 38 for individual devices.

The POS application 36 generates the transaction information print data that is printed on the receipt R based on product data and input information sent from the POS server 6, and passes the transaction information print data through the operating system 35 to the printer control object 37 and from the control object 37 to the service object 38 for that model of duplex printer 3. The service object 38 processes the transaction information print data to generate and send print commands corresponding to the command language of the duplex printer 3 to the duplex printer 3. Note that the control object 37 and service object 38 are combined into a printer driver 39 that is supplied by the OPOS described above to the user.

The POS application 36 also generates code data (data to be scanned) such as a linear or 2D barcode that identifies the transaction and is printed on the receipt R according to the content of the transaction process. The POS application 36 also reads graphic data for a previously stored logo, for example, and adds the graphic data to the transaction information print data, which is text data. Note that the transaction information print data combined with the code data and/or graphic data is the print data D.

When generating the print data D for duplex printing, the POS application 36 generates and sends front print data D1 and back print data D2 to the duplex printer 3. The printing positions of the code data and graphic data are adjusted in the front print data D1 and back print data D2 so that graphic data is not printed on the surface on the opposite side as the surface of the receipt R where the code data is printed.

More specifically, the POS application 36 has functions rendering a first analyzing unit that determines if code data is contained in the print data to be printed on one side of the receipt R, a second analyzing unit that determines if graphic data is contained in the print data to be printed on the other side, and a data adjustment unit that adjusts the print data when graphic data is found so that the code data and graphic data will not be printed at overlapping positions on opposite sides of the receipt R.

The host device 2 functions as a print data processing device.

Note that the transaction ID code data and graphic data could be generated by the POS server 6 (or stored in the POS server 6), and acquired therefrom by the host device 2 and added to the transaction information print data. The graphic data could also be stored in the printer driver 39 and added by the printer driver 39 to the transaction information print data.

Duplex Printer

Figure 2:
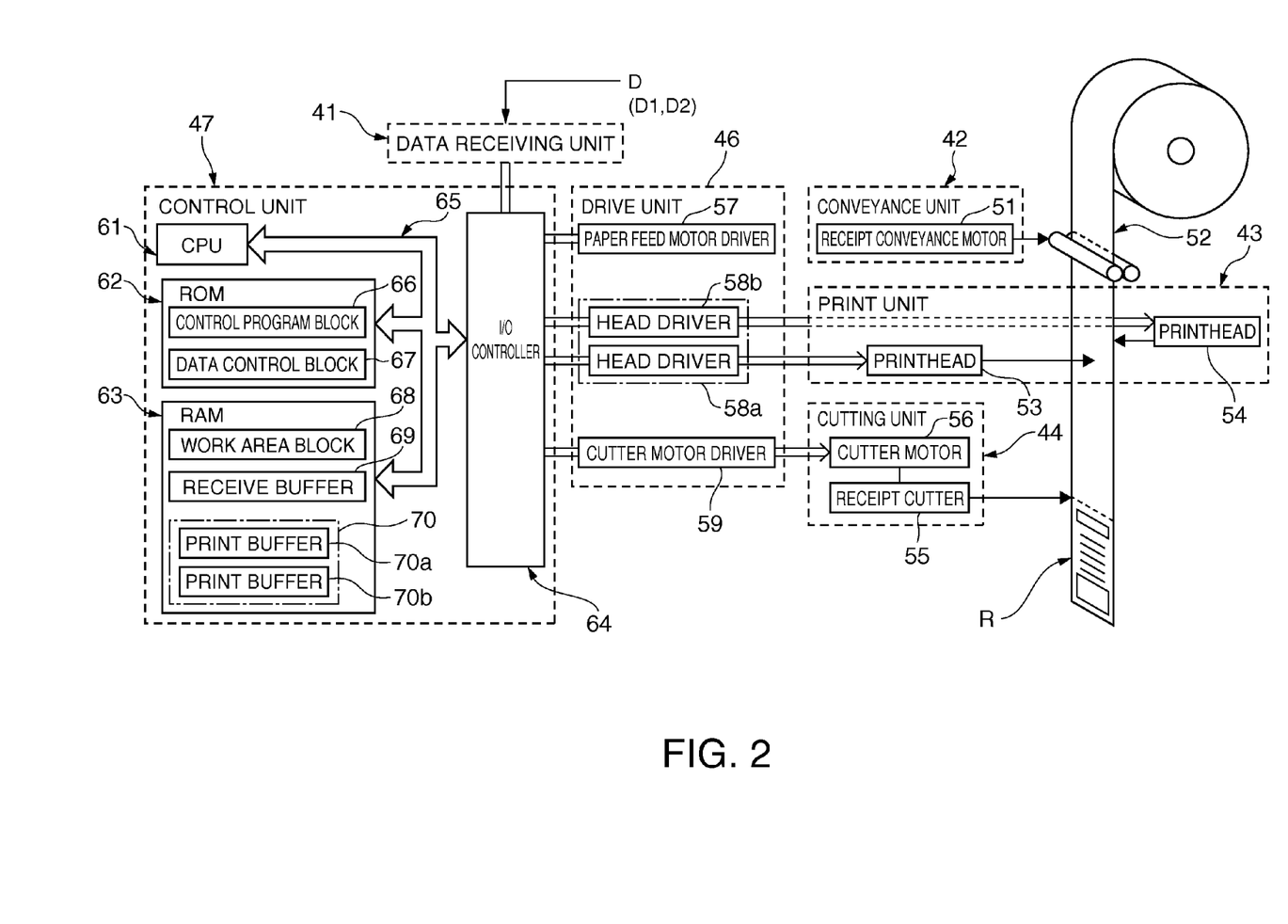
FIG. 2 is a control block diagram of the duplex printer in FIG. 1.

The duplex printer 3 is a receipt printer with a thermal head, and as shown in FIG. 2 includes a data receiving unit 41 that receives control commands and print data from the host device 2, a conveyance unit 42, a print unit 43, a cutting unit 44, a drive unit 46 that drives units 42 to 44, and a control unit 47 that controls overall operation of the duplex printer 3. The duplex printer 3 is not limited to using a thermal print data, and could use an inkjet head, for example.

The conveyance unit 42 of the duplex printer 3 has a receipt conveyance motor 51, and conveys continuous receipt paper 52 (such as roll paper) when a paper feed switch (not shown in the figure) is pressed or in conjunction with printing.

The print unit 43 includes a first printhead (thermal head) 53 that prints on the front of the receipt paper 52, and a second printhead (thermal head) 54 that prints on the back of the receipt paper 52, prints on the receipt paper 52 synchronized to receipt paper 52 conveyance, and can produce receipts R printed on both sides.

The cutting unit 44 has a receipt cutter 55 and a cutter motor 56 that drives the cutter, and a receipt R of a specific length is obtained by cutting the trailing end of the leading part of the printed receipt paper 52.

The drive unit 46 includes a paper feed motor driver 57, head drivers 58a and 58b, and a cutter motor driver 59.

The control unit 47 includes a CPU 61, ROM 62, RAM 63, and an input/output (I/O) controller 64 connected together by an internal bus 65.

ROM 62 includes a control program block 66 that stores a control program that the CPU 61 runs to control operations, and a data control block 67 that stores control data such as character font data for printing text. Note that the character font data may be stored separately in a CG-ROM device instead of in ROM 62.

RAM 63 includes various work area blocks 68 used for flags, for example, a receive buffer 69 that temporarily stores print data received by the data receiving unit 41, and a print buffer 70 that stores data converted to a form printable by the print unit 43, and is used as working memory for control processes. The receive buffer 69 stores print data received in line units as line data in the order received, and has capacity sufficient to store plural lines of data.

Included in the print buffer 70 are a first print buffer 70a that stores front print data for printing by the first printhead 53, and a second print buffer 70b that stores back print data for printing by the second printhead 54. Front print data and back print data converted to print images based on the print data stored in the receive buffer 69 is stored in print buffers 70a and 70b. RAM 63 is constantly backed up so that stored data is not lost if the power is interrupted. Note that the data could be stored in nonvolatile memory (flash ROM, EEPROM, for example) instead of RAM 63.

The I/O controller 64 is rendered by combining gate arrays and customized integrated circuits, for example, with logic circuits that complement CPU 61 functions and handle interface signals with peripheral circuits. As a result, the I/O controller 64 directly passes or processes and then passes print data received from the host device 2 to the internal bus 65, and in conjunction with the CPU 61 directly outputs or processes and outputs data and control signals output from the CPU 61 to the internal bus 65 to the drive unit 46. As a result, the CPU 61 inputs and outputs signals and data from other parts of the duplex printer 3 through the I/O controller 64 according to the control program in ROM 62 and settings stored in RAM 63. In other words, the CPU 61 controls printing print data received from the host device 2 by processing data in RAM 63 based on input signals and data, and outputting signals and data to parts of the duplex printer 3 through the I/O controller 64.

Embodiment 1

Generating Print Data on the Host Device

Figure 3:
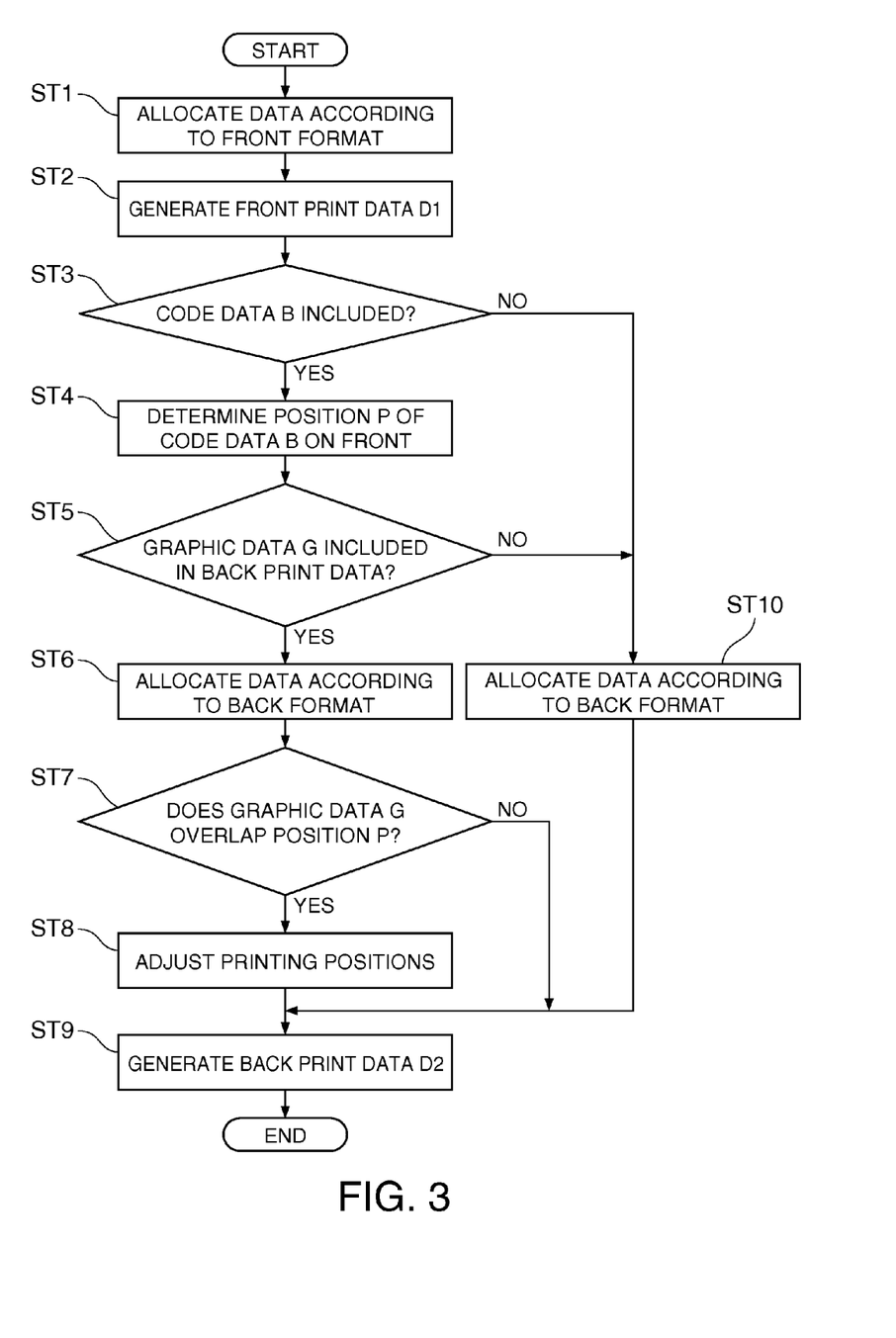
FIG. 3 is a flow chart describing the print data processing operation of the POS terminal shown in FIG. 1.
Figure 4:
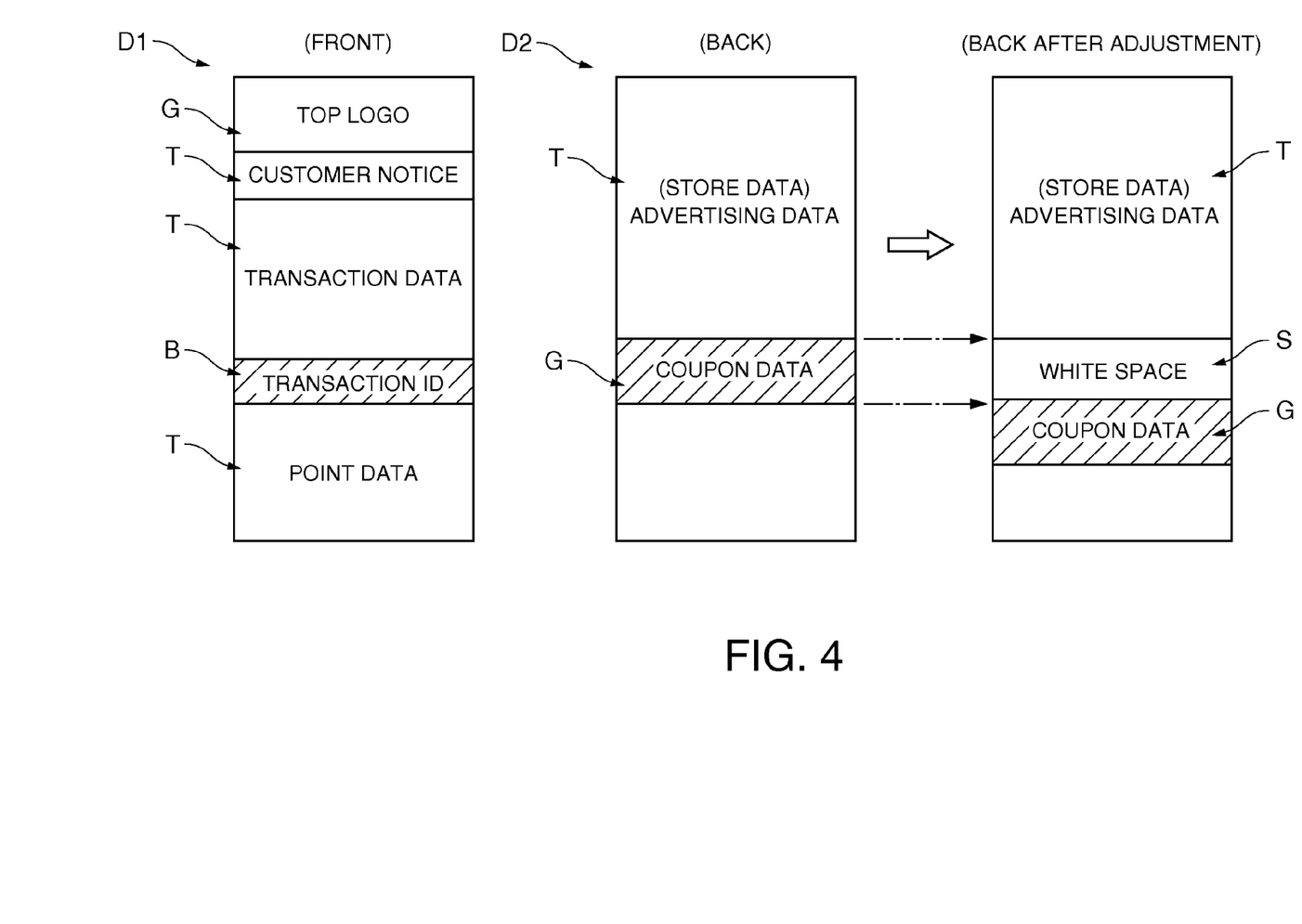
FIG. 4 describes an example of a printing position adjustment method.

FIG. 3 is a flow chart showing the steps executed by the POS application 36 of the host device 2 to generate front print data D1 and back print data D2. FIG. 4 shows an example of a method of adjusting the printing position on the receipt R, FRONT indicating the placement of the front print data D1, BACK indicating the placement of the back print data D2, and BACK AFTER ADJUSTMENT indicating the placement of the back print data D2 after printing position adjustment.

Referring to these figures, when transaction data is received from the POS server 6 side, the host device 2 generates print data based on settings stored in the printer driver 39. If duplex printing is specified, front print data D1 and back print data D2 are generated as the print data D.

First, in step ST1 in FIG. 3, data in the transaction information is allocated according to a predefined front format, and based thereon the front print data D1 is generated in step ST2. If code data (first print data) B is contained in the front print data D1 is then determined in step ST3 (first analysis step). If it is, control goes to step ST4 as indicated by YES, and the position is recognized.

For example, as shown in the FRONT in FIG. 4, a logo consisting of a graphic data G, a notice and transaction data consisting of text data T, transaction ID data consisting of code data B, and point data consisting of text data T are disposed on the front of the receipt.

In step ST5 in FIG. 3, whether graphic data (second print data) G is contained in the data included in the back print data D2 included in the data in the transaction information is determined (second analysis step). If graphic data G is contained in the back print data D2, control goes from step ST5 in FIG. 3 to step ST6 as indicated by YES, and the data printed on the back is allocated according to a predefined back format. Whether the printing position of the graphic data G printed on the back overlaps the printing position of the code data B printed on the front is then determined in step ST7.

If, as shown in BACK in FIG. 4, the position of the graphic data G printed on the receipt back overlaps the position of the code data B on the front, control goes from step ST7 to step ST8 as indicated by YES in FIG. 3, and the printing position is adjusted (position adjustment step) so that the printing position of the graphic data G does not overlap the printing position of code data B. In step ST9, the back print data D2 is edited and the back print data D2 supplied to the duplex printer 3 is generated based on the adjusted position.

For example, as shown under BACK AFTER ADJUSTMENT in FIG. 4, the position of the graphic data G is adjusted by inserting white space S to the printing position of graphic data G in the back print data D2 so that the printing position of the graphic data G is moved to a position shifted along the length of the receipt paper from the printing position of the code data B, and back print data D2 including this white space S is generated.

As a result, problems such as the scanning accuracy of code data B being reduced by printing graphic data G with a high print density on the opposite side at the same printing position as the code data B can be avoided. In the example shown in FIG. 4, the position of the graphic data G is shifted by inserting white space S, but when text data T is included in the data printed on the back, text data T could be inserted instead of white space S. The scanning accuracy of the code data B is generally not reduced when text data T is printed on the back side of the code data B. Note, however, that white space S must be inserted when thin receipt paper is used and the scanning accuracy of the code data B could be reduced by printing text data T on the back side of the code data B.

However, if the position of the graphic data G printed on the back of the receipt does not overlap the position of the code data B on the front, control goes from step ST7 to step ST9 as indicated by NO in FIG. 3, and the back print data D2 is generated without adjusting the position of the graphic data G.

If there is no code data B contained in the front print data D1, control goes from step ST3 to step ST10 as indicated by NO in FIG. 3, data to be printed on the back is allocated according to the back format, and back print data D2 is generated based thereon in step ST9. Likewise, if graphic data G is not contained in the back print data, control goes from step ST5 to step ST10 as indicated by NO in FIG. 3, data to be printed on the back is allocated according to the back format, and back print data D2 is generated based thereon in step ST9.

Other Examples of Position Adjustment

Examples of other position adjustment methods for preventing the printing position of graphic data G from overlapping the printing position of code data B are described below.

Example 1

Figure 5:
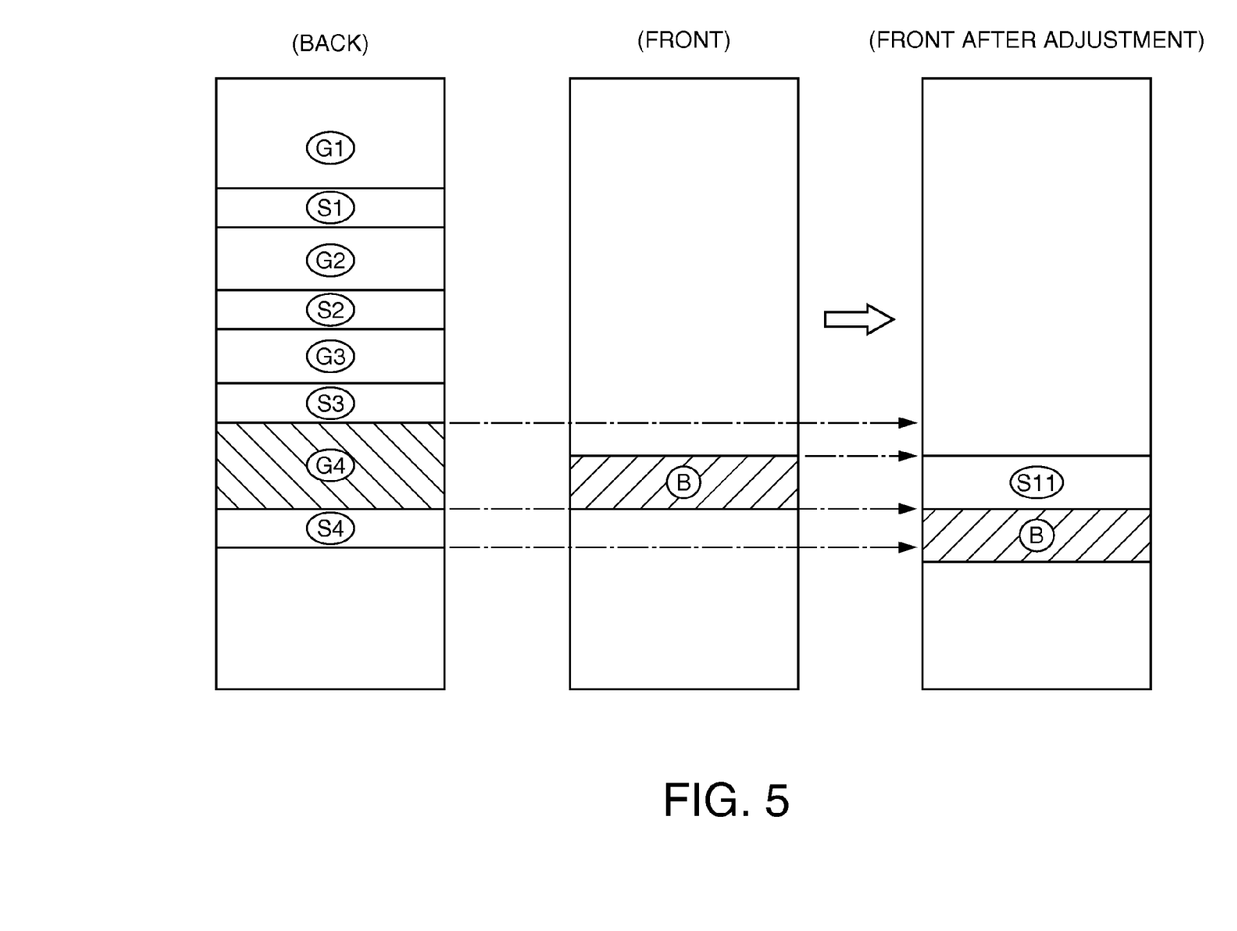
FIG. 5 describes an example of a printing position adjustment method.

In the example shown in FIG. 5, when plural graphics G1 to G4 are included in the back print data of the receipt R, the printing positions are adjusted by inserting white spaces S1, S2, S3 of a constant width between the graphics as shown under BACK in FIG. 5, for example, to generate the back print data D2. When the printing position of code data B in the front print data overlaps the printing position of graphic data G4 on the back side, the front print data D1 is generated by inserting white space S11 to the printing position of code data B in the front print data as shown in FRONT in FIG. 5 so that the printing position of code data B is adjusted to a position opposite white space S4 adjacent to graphic data G4.

Example 2

Figure 6:
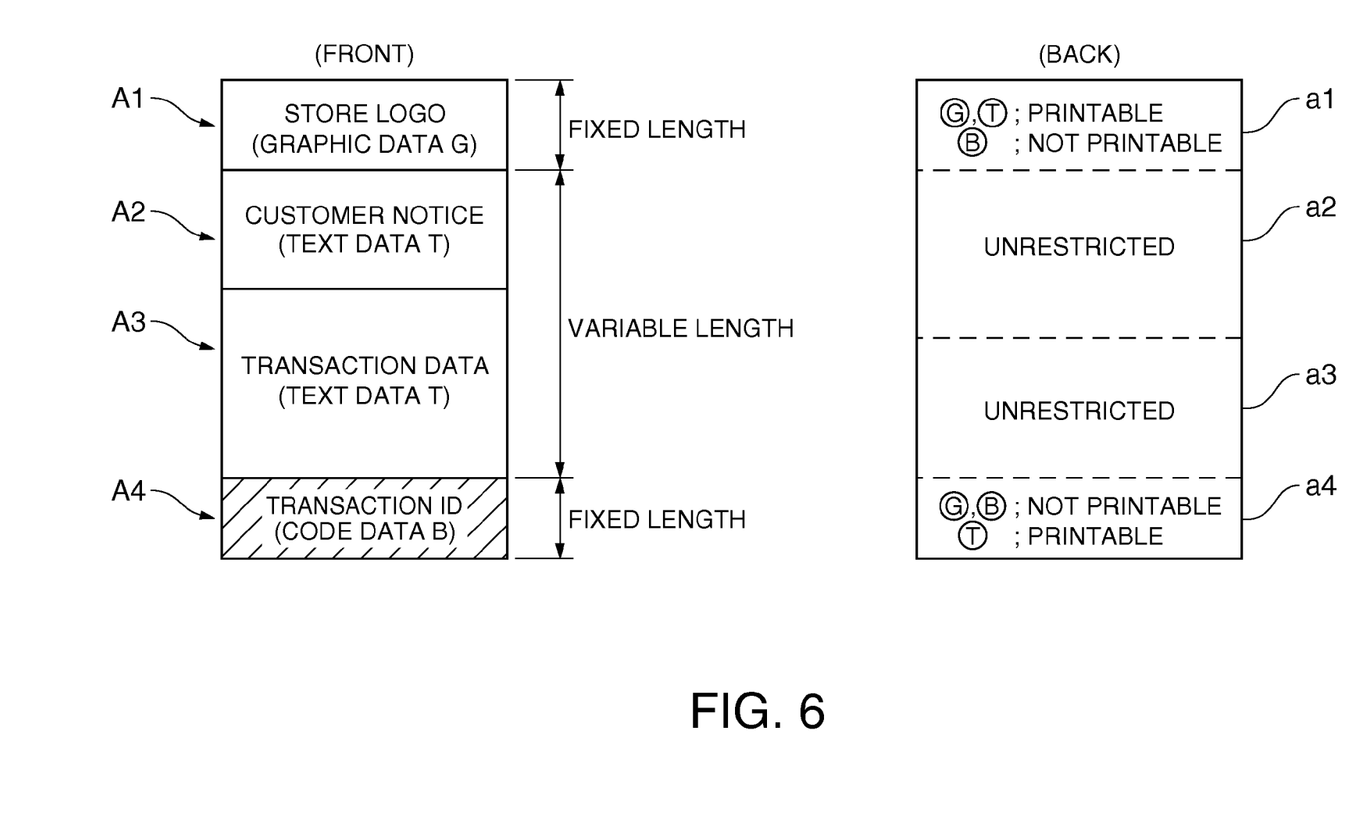
FIG. 6 describes an example of a printing position adjustment method.

When printing a receipt, the format of the receipt front generally includes a fixed-length print area A1 for printing graphic data G such as a store logo at the leading end of the receipt, a fixed-length print area A4 for code data B such as a transaction ID printed at the trailing end of the receipt, and print areas A2, A3 therebetween that vary in length according to the amount of transaction data as shown in FRONT in FIG. 6. These variable-length areas include variable-length area A2 where a store notice, for example, composed of text data T is printed, and a variable-length area A3 where transaction data composed of text data T is printed.

In this case, as shown in BACK in FIG. 6, the back print data area is also divided into print areas a1 to a4 corresponding to the front print areas A1 to A4, print area a4 corresponding to the front print area where code data B is printed is set as a no-print zone for graphic data G, and the printing positions are adjusted so that graphic data G is printed in any of areas a1 to a3 to generate the back print data D2. If code data B is included in the data to be printed on the back, adjustment is made so that the code data B is not printed to print area a1 corresponding to the print area A1 where graphic data G is printed on the front to generate the back print data D2.

Therefore, in the example shown in FIG. 6, the back print area a1 is an area where text data T and graphic data G can be printed, print areas a2 and a3 are areas where any of data types T, G, B can be printed, and print area a4 is an area where only text data T can be printed. Note that if graphic data G is printed on front and back, back print area a1 could be set as an area where only text data T can be printed if, for example, there is the possibility of the readability of the graphic data G on the front dropping.

Example 3

Figure 7:
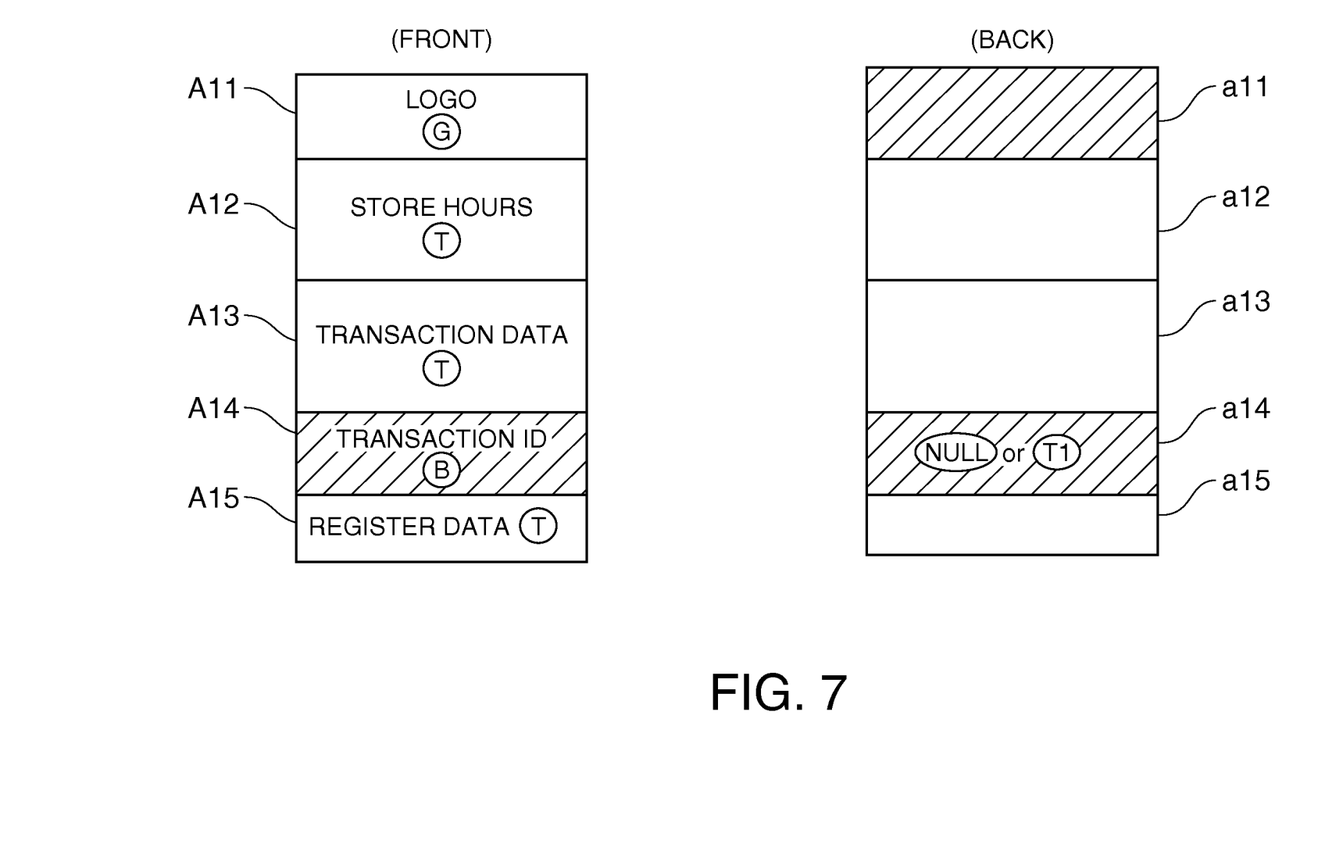
FIG. 7 describes an example of a printing position adjustment method.

In the example in FIG. 6, printing graphic data G on the back side of code data B is prevented by adjusting the distribution of data printed in the print areas a1 to a4 on the back side. Alternatively, as shown in FIG. 7, of the print areas a11 to a15 on the back, print area a14 corresponding to print area A14 where the code data B is printed on the front is set as a restricted area, and the data printed in this area a14 can be limited to NULL data or text data T1 of predetermined content. Likewise, print area a11 corresponding to print area A11 where graphic data G is printed on the front is set as a restricted area, and printing in this area can be restricted so that code data B is not printed therein.

Embodiment 2

Print Data Position Adjustment by the Duplex Printer

Figure 8:
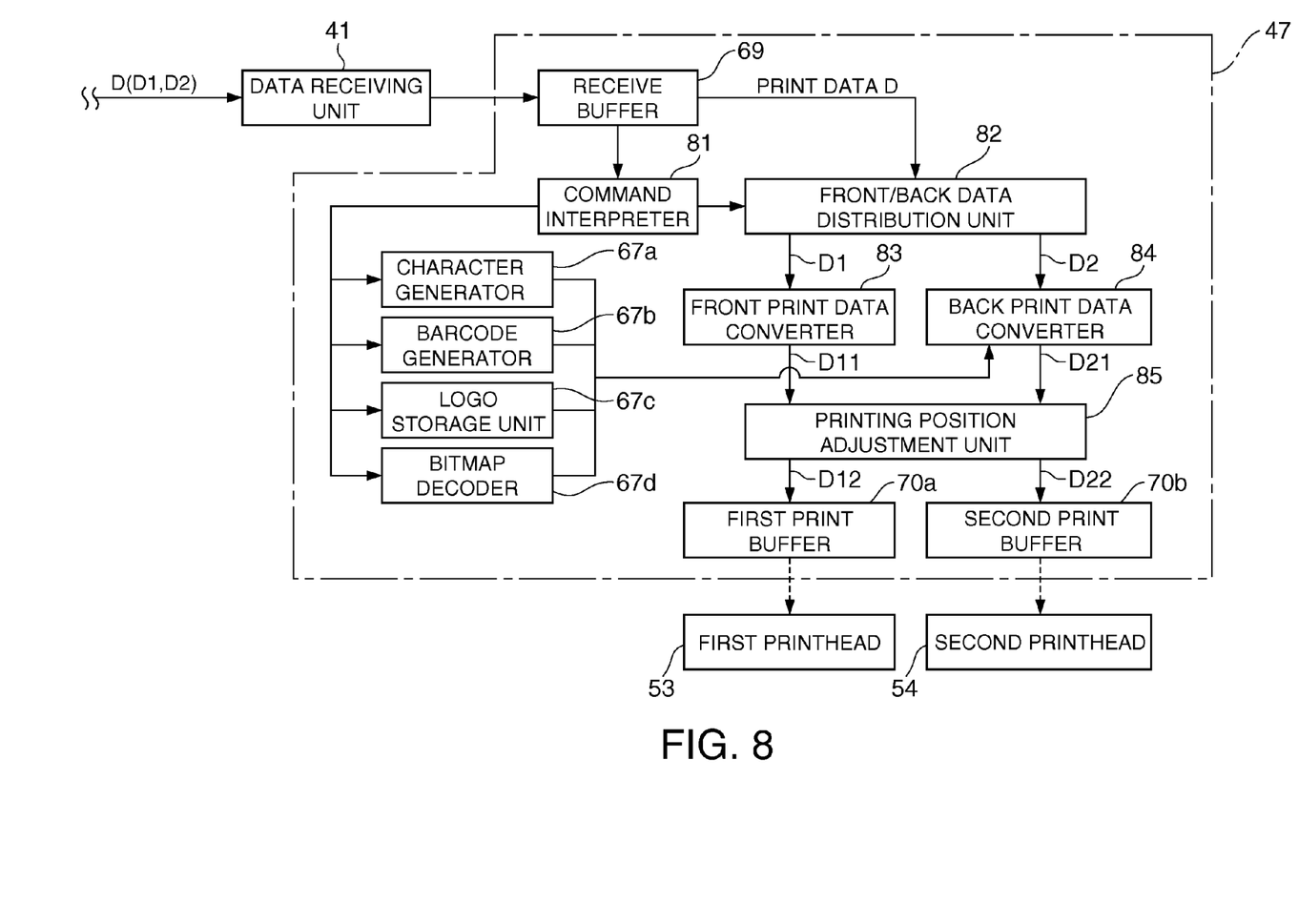
FIG. 8 is a function block diagram of the control unit of the duplex printer.

The positions of the front print data D1 and back print data D2 are adjusted by the host device 2 in the first embodiment, but in this embodiment of the invention the positions of the front print data D1 and back print data D2 are adjusted by the duplex printer 3. FIG. 8 is a function block diagram showing the main functions executed by the control unit 47 of the duplex printer 3. Note that in this embodiment of the invention the duplex printer 3 functions as the print data processing device of the invention.

To issue a receipt R printed on both sides, the host device 2 generates and sends front print data (first surface print data) D1 and back print data (second surface print data) D2 to the duplex printer 3 for printing to the front (first surface) and back (second surface) of the receipt R as the transaction information print data D. The print data D for duplex printing sent from the host device 2 side is temporarily stored in the receive buffer 69 on the duplex printer 3 side. The print data stored in the receive buffer 69 is interpreted by the command interpreter 81, and split into data D1 for printing the front and data D2 for printing the back by the front/back data distribution unit 82. After distribution, the data D1 and D2 is then converted by the front print data converter 83 and back print data converter 84 based on output from a character generator 67a, barcode generator 67b, logo storage unit 67c, and bitmap decoder 67d.

The printing position of the converted front and back bitmap data D11, D12 is adjusted by the printing position adjustment unit 85. More specifically, when generating print data D for duplex printing, the printing positions of the code data B and the graphic data G are converted so that graphic data G is not printed on the surface on the opposite side of the receipt R surface where the code data B is printed. The converted data is then written to the front print buffer 70a and back print buffer 70b as the front print data D12 and back print data D22. The resulting data is then printed on the front and back sides of the receipt paper 52 by the first printhead 53 and second printhead 54, and a receipt R printed on both sides is produced.

Primarily the command interpreter 81 in the control unit 47 of the duplex printer 3 thus functions as a first analyzing unit that determines if code data B is contained in the print data D1 to be printed on one side of the receipt R, and a second analyzing unit that determines if graphic data G is contained in the print data D2 to be printed on the other side. In addition, primarily the printing position adjustment unit 85 functions as a data adjustment unit that adjusts the print data when graphic data G is found so that the code data B and graphic data G will not be printed at overlapping positions on opposite sides of the receipt R.

Figure 9:
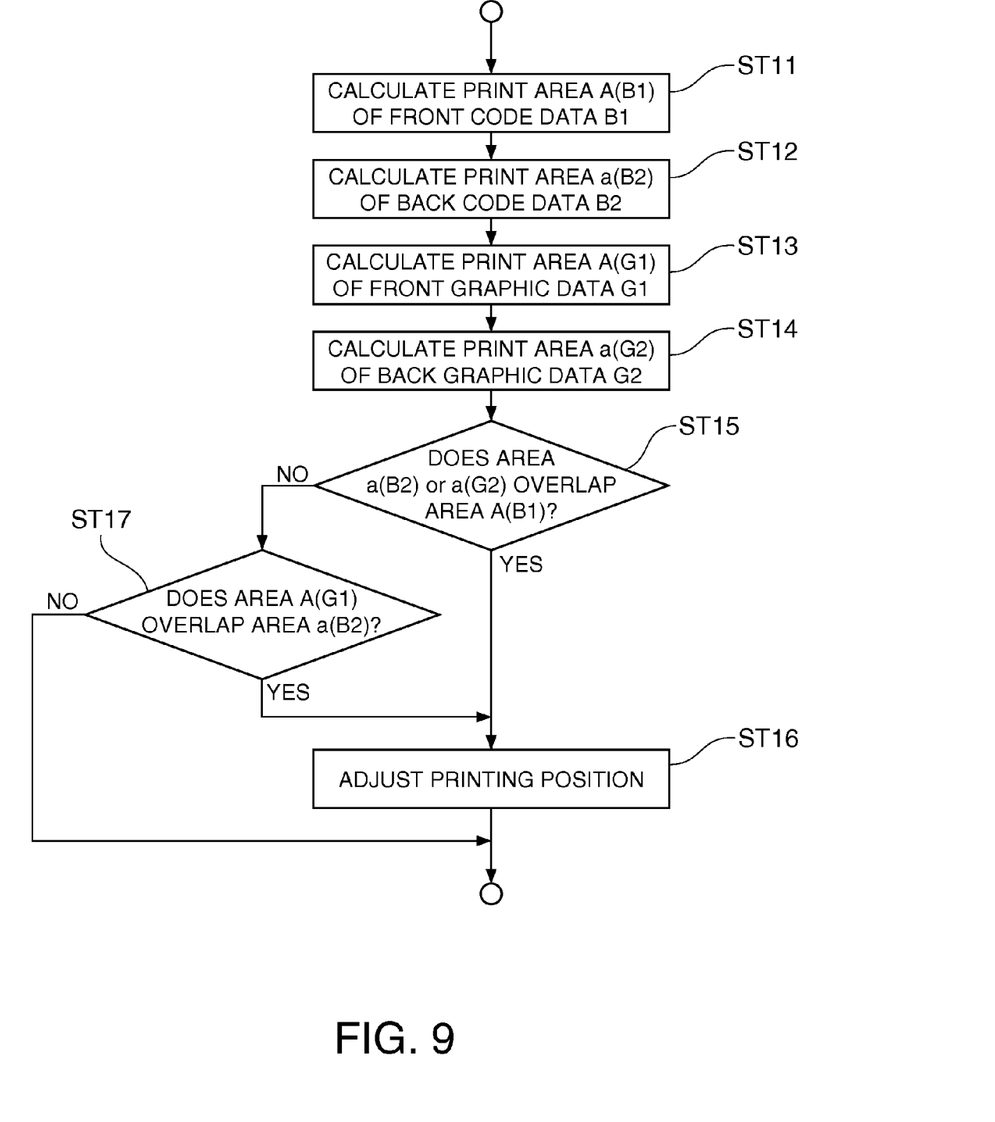
FIG. 9 is a flow chart of an operation that determines if adjusting the printing position of the duplex printer is necessary.

FIG. 9 is a flow chart of a process that determines if adjusting the printing positions of the duplex printer is needed, and more specifically is a flow chart of steps executed by the control unit of the duplex printer to determine if adjusting the printing positions of the front print data and the back print data is necessary.

As shown in FIG. 9, the control unit determines in step ST11 if code data B1 (a linear barcode or 2D barcode) is contained in the received front print data D1, and if it is calculates the print area A(B1) thereof. Next, in step ST12, the control unit determines if code data B2 (a linear barcode or 2D barcode) is contained in the received back print data D2, and if it is calculates the print area a(B2) thereof.

Next, in step ST13, the control unit calculates if graphic data G1 is contained in the front print data D1, and if it is calculates the print area A(G1) thereof. Then in step ST14, the control unit calculates if graphic data G2 is contained in the back print data D2, and if it is calculates the print area a(G2) thereof.

In step ST15, the control unit then determines if print area a(B2) of code data B2 or print area a(G2) of graphic data G2 on the back side overlaps the print area A(B1) of code data B1 on the front side. If there is overlap, control goes from step ST15 to step ST16 as indicated by YES, and the printing position is adjusted.

If step ST15 determines there is no overlap, control goes to step ST17 as indicated by NO, and whether the print area A(G1) of graphic data G1 on the front side overlaps the print area a(B2) of code data B2 on the back side is determined. If there is overlap, control goes from step ST17 to step ST16 as indicated by YES, and the printing position is adjusted. If there is no overlap, control follows NO, and the printing position is not adjusted.

Note that steps ST11 to ST14 in this determination process can be executed in a different order, and the order of steps ST15 and ST17 can be reversed. Furthermore, while the code data B scanning accuracy is generally not reduced by printing text data on the reverse side of the code data B, if the code data B scanning accuracy may be reduced by printing text data on the reverse side of the code data B, such as when thin receipt paper is used, the printing position can be adjusted so that there is white space on the surface opposite the code data B.

Examples of Duplex Printing of Receipts

Figure 10:
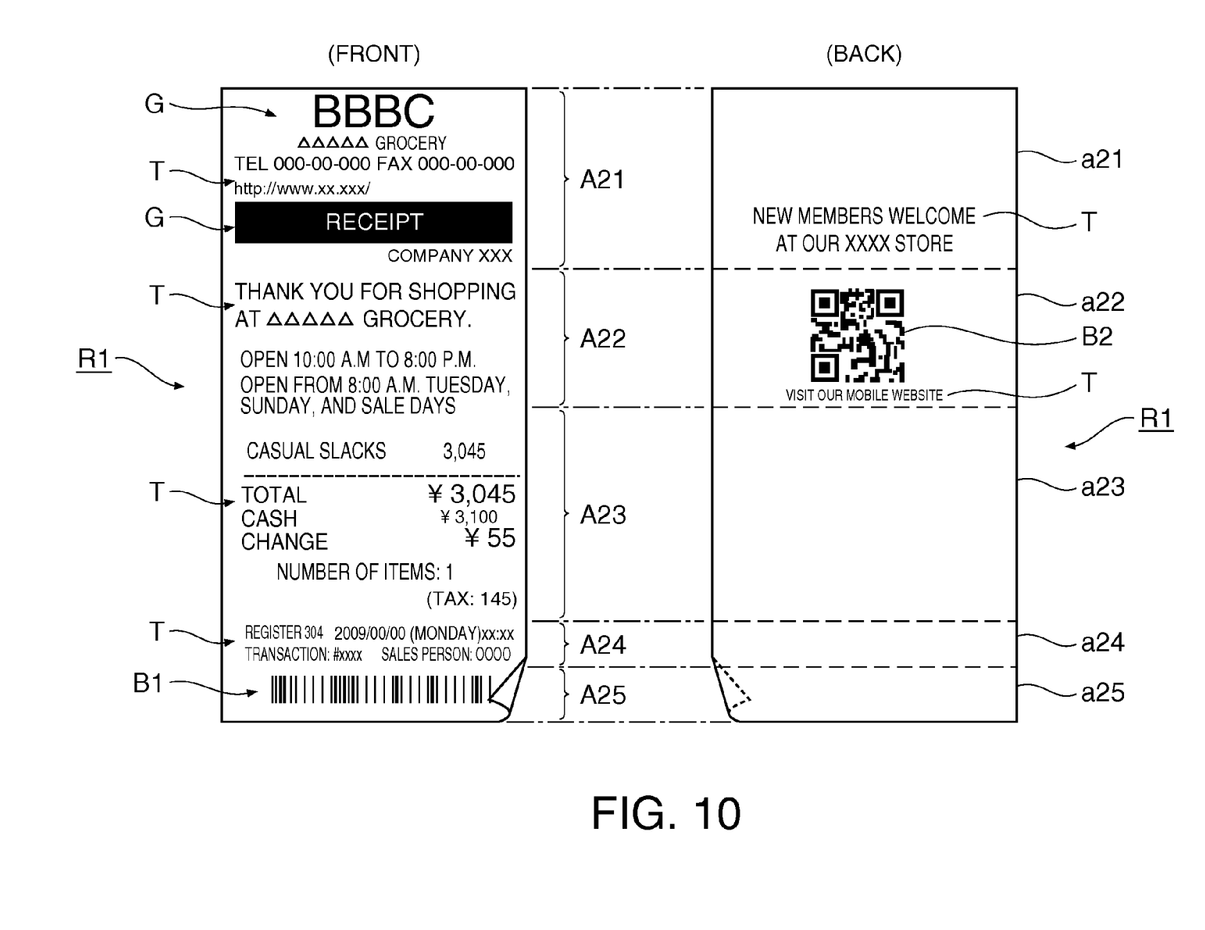
FIG. 10 shows an example of a printed receipt.

FIG. 10 shows an example of front-side printing and back-side printing on a receipt. As shown in this figure, data to be printed on receipt R1 in front print areas A21 to A25 is included in the front print data for producing a receipt (first-surface print data for producing a receipt). Included in the front print area A21 is store information such as a store logo, which is graphic data G, and text data T such as "RECEIPT" and other text data T. Business information, which is text data T, is included in front print area A22. Transaction data, which is text data T, is included in front print area A23. Receipt data, which is text data T, is included in front print area A24, and transaction ID data in the form of a linear barcode B1 is included in front print area A25. Advertising data, coupon data, and points data, for example, may also be printed on the front of the receipt R1.

Back print areas a21 to a25 of receipt R1 are areas at positions corresponding to front print areas A21 to A25. A member solicitation message, which is text data T, is printed in the back print area a21 corresponding to front print area A21; and mobile website data in the form of a 2D barcode B2 and text data T are printed to back print area a22 corresponding to front print area A22 where text data T is printed. Advertising data, coupon data, and points data, for example, may also be included with the linear barcode or 2D barcode in the back print data for producing a receipt (second-surface print data for producing a receipt).

Graphic data G is not printed on the back side of the barcode B1 representing the transaction ID printed on the front on receipt R1, and graphic data G is also not printed on the front side of the 2D barcode B2 representing the mobile website printed on the back. Therefore, the scanning accuracy of the barcode data will not be reduced by the bleed-through or transparency of graphic data printed with a high print density on the opposite side.

Other Embodiments

The foregoing embodiments apply the invention to a POS system, but the invention is not limited to a particular type of terminal if the printing system includes a host device that generates print data for duplex printing including graphic data or code data, and a printer having a printhead for duplex printing.

Furthermore, while the foregoing embodiments apply the invention to a duplex printer used with the POS terminal of a POS system, the invention can be applied to any duplex printer that can print data for duplex printing including graphic data and code data.

The invention can also be applied to any type of duplex printer, including duplex printers that use a single printhead and duplex printers that use two printheads as described in the related art above.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A method of processing print data for printing on both sides of a recording medium, comprising:
    analyzing first-surface print data to be printed on a first surface on one side of the recording medium to determine if code data is contained therein, and if so, calculating an area thereof (A(B1));
    analyzing the first-surface print data to determine if graphic data is contained therein, and if so, calculating an area thereof (A(G1));
    analyzing second-surface print data to be printed on a second surface on the other side of the recording medium to determine if graphic data is contained therein, and if so, calculating an area thereof (a(G2));
    analyzing the second-surface print data to determine if code data is contained therein, and if so, calculating an area thereof (a(B2)); and
    determining if area a(B2) or area a(G2) overlaps area A(B1),
        if so, automatically adjusting at least one of the first-surface print data and the second-surface print data to avoid area a(B2) or area a(G2) overlapping area A(B1),
        if not determining if area A(G1) overlaps area a(B2),
            if so, automatically adjusting at least one of the first-surface print data and the second-surface print data to avoid area A(G1) overlapping area a(B2).

2. The print data processing method described in claim 1, wherein:
    the code data is linear barcode data or two-dimensional barcode data.

3. The print data processing method described in claim 1, further comprising:
    adjusting the second-surface print data so that an area on the second surface opposite an area on the first surface where the code data is to be printed is blank space or is designated for text data contained in the second-surface print data.

4. The print data processing method described in claim 1, wherein:
    the second-surface print data contains a plurality of types of data including the graphic data; and
    the method further comprises adjusting the second-surface print data so that blank space is inserted between two of the plurality of types of data, and adjusting the first-surface print data so that the code data is printed in an area on the first surface opposite the blank space.

5. The print data processing method described in claim 1, wherein:
    a print area on the second surface is divided into a plurality of predefined areas; and
    the method further comprises adjusting the second-surface print data so that the graphic data is not printed in a predefined area on the second surface opposite an area on the first surface where the code data is printed.

6. The print data processing method described in claim 1, wherein:
part of a print area on the first surface is designated for the code data; and
the method further comprises adjusting the second-surface print data so that the graphic data is not printed in an area on the second surface opposite the part of the print area on the first surface designated for the code data.

7. The print data processing method described in claim 1, wherein:
the first-surface print data is for producing a receipt containing text data representing transaction content and the code data, which represents an ID for identifying the transaction or representing store data; and
the second-surface print data is for producing a receipt containing the graphic data, which is for a coupon or advertisement.

8. A print data processing device that processes print data for printing on both sides of a recording medium, comprising:
a first analyzing unit that determines if code data is contained in first-surface print data to be printed on a first surface on one side of the recording medium, and if so, the first analyzing unit calculates an area thereof (A(B1)),
the first analyzing unit also determining if graphic data is contained in the first-surface print data, and if so, calculating an area thereof (A(G1));
a second analyzing unit that determines if graphic data is contained in second-surface print data that is to be printed on a second surface on the other side of the recording medium, and if so, the second analyzing unit calculates an area thereof (a(G2)),
the second analyzing unit also determining if code data is contained in the second-surface print data, and if so, calculating an area thereof (a(B2)); and
a data adjustment unit that determines if area a(B2) or area a(G2) overlaps area a(B1),
if so, the data adjustment unit automatically adjusts at least one of the first-surface print data and the second-surface print data to avoid area a(B2) or area a(G2) overlapping area A(B1),
if not, the data adjustment unit determines if area A(G1) overlaps area a(B2),
if so, data adjustment unit automatically adjusts at least one of the first-surface print data and the second-surface print data to avoid area A(G1) overlapping area a(B2).

9. The print data processing device described in claim 8, wherein:
the code data is linear barcode data or two-dimensional barcode data.

10. The print data processing device described in claim 8, wherein:
the data adjustment unit adjusts the second-surface print data so that an area on the second surface opposite an area on the first surface where the code data is to be printed is blank space or is designated for text data contained in the second-surface print data.

11. The print data processing device described in claim 8, wherein:
the second-surface print data contains a plurality of types of data including the graphic data; and
the data adjustment unit adjusts the second-surface print data so that blank space is inserted between two of the plurality of types of data, and adjusting the first-surface print data so that the code data is printed in an area on the first surface opposite the blank space.

12. The print data processing device described in claim 8, wherein:
a print area on the second surface is divided into a plurality of predefined areas; and
the data adjustment unit adjusts the second-surface print data so that the graphic data is not printed in a predefined area on the second surface opposite an area on the first surface where the code data is printed.

13. The print data processing device described in claim 8, wherein:
part of a print area on the first surface is designated for the code data; and
the data adjustment unit adjusts the second-surface print data so that the graphic data is not printed in an area on the second surface opposite the part of the print area on the first surface designated for the code data.

14. A print data processing system including a duplex printing device that prints on both sides of a recording medium, and a host device that is connected to the duplex printing device and sends print data for printing on both sides of a recording medium, wherein either the duplex printing device or the host device comprises:
a first analyzing unit that determines if code data is contained in first-surface print data to be printed on a first surface on one side of the recording medium, and if so, the first analyzing unit calculates an area thereof (A(B1)),
the first analyzing unit also determining if graphic data is contained in the first-surface print data and if so, calculating an area thereof (A(G1));
a second analyzing unit that determines if graphic data is contained in second-surface print data that is to be printed on a second surface on the other side of the recording medium, and if so, the second analyzing unit calculates an area thereof (a(G2)),
the second analyzing unit also determining if code data is contained in file second-surface print data, and if so, calculating an area thereof (a(B2)); and
a data adjustment unit that determines if area a(B2) or area a(G2) overlaps area A(B1),
if so, the data adjustment unit automatically adjusts at least one of the first-surface print data and the second-surface print data to avoid area a(B2) or area a(G2) overlapping area A(B1),
if not, the data adjustment unit determines if area A(G1) overlaps area a(B2),
if so, the data adjustment unit automatically adjusts at least one of the first surface print data and the second-surface print data to avoid area A(G1) overlapping area a(B2).

15. The print data processing system described in claim 14, wherein:
the code data is linear barcode data or two-dimensional barcode data.

16. The print data processing system described in claim 14, wherein:
the data adjustment unit adjusts the second-surface print data so that an area on the second surface opposite an area on the first surface where the code data is to be printed is blank space or is designated for text data contained in the second-surface print data.

17. The print data processing system described in claim 14, wherein:
the second-surface print data contains a plurality of types of data including the graphic data; and the data adjustment unit adjusts the second-surface print data so that blank space is inserted between two of the plurality of types of data, and adjusting the first-surface print data so that the code data is printed in an area on the first surface opposite the blank space.

18. The print data processing system described in claim 14, wherein:
   a print area on the second surface is divided into a plurality of predefined areas; and
   the data adjustment unit adjusts the second-surface print data so that the graphic data is not printed in a predefined area on the second surface opposite an area on the first surface where the code data is printed.

19. The print data processing system described in claim 14, wherein:
   part of a print area on the first surface is designated for the code data; and
   the data adjustment unit adjusts the second-surface print data so that the graphic data is not printed in an area on the second surface opposite the part of the print area on the first surface designated for the code data.

\* \* \* \* \*